(12) United States Patent
Patel

(10) Patent No.: US 7,575,627 B2
(45) Date of Patent: Aug. 18, 2009

(54) PHTHALOCYANINES AND THEIR USE IN INK-JET PRINTING

(75) Inventor: Prakash Patel, Manchester (GB)

(73) Assignee: Fujifilm Imaging Colorants Limited, Manchester (GB)

(*) Notice: Subject to any disclaimer, the term of this patent is extended or adjusted under 35 U.S.C. 154(b) by 146 days.

(21) Appl. No.: 11/791,984

(22) PCT Filed: Dec. 2, 2005

(86) PCT No.: PCT/GB2005/004634

§ 371 (c)(1),
(2), (4) Date: May 31, 2007

(87) PCT Pub. No.: WO2006/061579

PCT Pub. Date: Jun. 15, 2006

(65) Prior Publication Data

US 2008/0138592 A1   Jun. 12, 2008

(30) Foreign Application Priority Data

Dec. 11, 2004   (GB) ................. 0427199.5

(51) Int. Cl.
C09D 11/02   (2006.01)
C09B 47/04   (2006.01)
B41J 2/01   (2006.01)

(52) U.S. Cl. .................. 106/31.47; 8/638; 8/661; 347/100

(58) Field of Classification Search ............. 106/31.47; 8/638, 661; 347/100
See application file for complete search history.

(56) References Cited

U.S. PATENT DOCUMENTS

| | | | | |
|---|---|---|---|---|
| 5,123,960 | A * | 6/1992 | Shirota et al. | 106/31.46 |
| 5,704,969 | A * | 1/1998 | Kanaya et al. | 106/31.48 |
| 7,160,372 | B2 | 1/2007 | Yoshizawa et al. | 106/31.47 |
| 7,201,791 | B2 | 4/2007 | Okamura et al. | 106/31.47 |
| 7,247,194 | B2 | 7/2007 | Okamura et al. | 106/31.47 |
| 7,419,537 | B2 * | 9/2008 | Fujii et al. | 106/31.47 |
| 2006/0119683 | A1 | 6/2006 | Yoshizawa et al. | 347/100 |
| 2006/0152569 | A1 | 7/2006 | Jinnou et al. | 347/105 |
| 2007/0006772 | A1 | 1/2007 | Fujii et al. | 106/31.49 |
| 2007/0022903 | A1 | 2/2007 | Fujii et al. | 106/31.47 |
| 2007/0107627 | A1 | 5/2007 | Negishi et al. | 106/31.27 |
| 2007/0109378 | A1 | 5/2007 | Yamakami et al. | 347/100 |
| 2008/0018719 | A1 * | 1/2008 | Patel | 106/31.47 |

FOREIGN PATENT DOCUMENTS

| | | | |
|---|---|---|---|
| EP | 0 418 792 | 3/1991 | |
| EP | 0 468 649 | 1/1992 | |
| JP | 61 002772 | 1/1986 | |
| WO | WO 03/062323 | 7/2003 | |
| WO | WO 2007/072994 A1 | 6/2007 | |

OTHER PUBLICATIONS

Schofield et al., "Analysis of sulphonated phthalocyanine dyes by capillary electrophoresis", Journal of Chromatography, 770:345-348 (1997).

* cited by examiner

*Primary Examiner*—Helene Klemanski
(74) *Attorney, Agent, or Firm*—Morgan Lewis & Bockius LLP

(57) ABSTRACT

A mixture of dyes of Formula (1) and salts thereof; wherein M is 2H, Si, a metal, an oxymetal group, a hydroxymetal group or a halometal group; Pc represents a phthalocyanine nucleus of formula (2); $R^1$ is methyl; $R^2$ is H or methyl; $R^3$ and $R^4$ independently are H or optionally substituted $C_{1-4}$alkyl; L is a divalent linking group; A and B are independently H or a substituent. x is 0.1 to 3.8; y is 0.1 to 3.8; z is 0.1 to 3.8; the sum of (x+y+z) is 2 to 4; and the substituents, represented by x, y and z, are only attached to a β position on the phthalocyanine ring and the dyes are free from fiber reactive groups. Also compositions, inks, printed material and in-jet processes and cartridges.

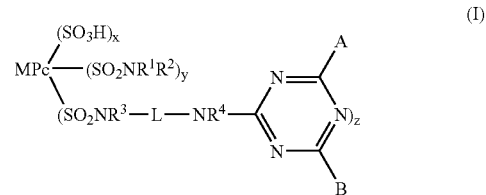

(I)

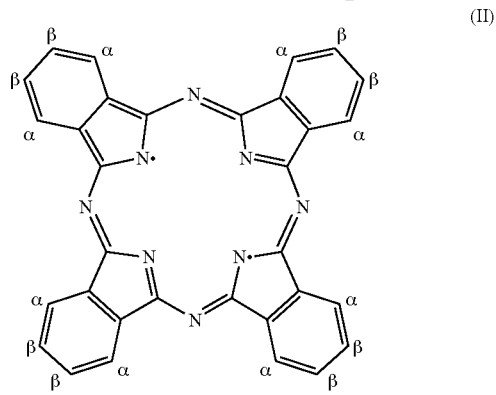

(II)

18 Claims, No Drawings

PHTHALOCYANINES AND THEIR USE IN INK-JET PRINTING

This invention relates to dyes, compositions and inks, to printing processes, to printed materials and to ink-jet printer cartridges.

Ink-jet printing is a non-impact printing technique in which droplets of ink are ejected through a fine nozzle onto a substrate without bringing the nozzle into contact with the substrate.

Colour ink-jet printers typically use four different coloured inks; magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

While ink-jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months.

With the advent of high-resolution digital cameras and ink-jet printers it is becoming increasingly common for consumers to print off photographs using an ink-jet printer. This avoids the expense and inconvenience of conventional silver halide photography and provides a print quickly and conveniently. However this use of ink-jet printers requires that the prints should display an outstanding fastness to light and common oxidising gases such as ozone. Photographs, once printed, are often kept on display for years and it has been found that even apparently small changes in the light and ozone fastness of a print in a test systems can correlate to a significant improvement in the fastness of the image in real life.

Most cyan colorants used in ink-jet printing are based on phthalocyanines and problems of fading and shade change on exposure to light and contact with ozone are particularly acute with dyes of this class.

Phthalocyanines bearing sulfonate and sulfonamide substituents have found particular utility in ink-jet printing. These dyes are usually made by sulfonating a phthalocyanine pigment followed by chlorination and then amination/amidation, the resultant product carries sulfo and sulfonamide/substituted sulfonamide substituents in any susceptible position (for example see Schofield, J and Asaf, M in Journal of Chromatography, 1997, 770, pp 345-348).

However we have found that certain phthalocyanines substituted only in the β-position display advantageous properties when used in ink-jet printing.

The present invention provides a mixture of dyes of Formula (1) and salts thereof:

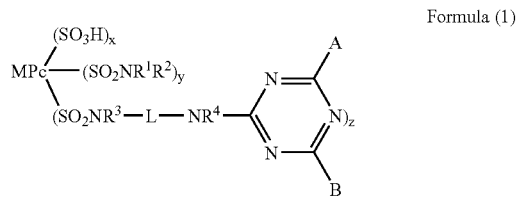

Formula (1)

wherein:
M is 2H, Si, a metal, an oxymetal group, a hydroxymetal group or a halometal group;
Pc represents a phthalocyanine nucleus of formula

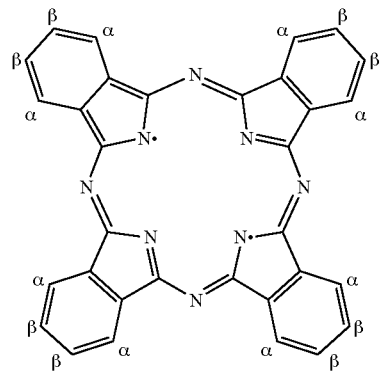

$R^1$ is methyl;
$R^2$ is H or methyl;
$R^3$ and $R^4$ independently are H or optionally substituted $C_{1-4}$alkyl;
L is a divalent linking group;
A and B are independently H or a substituent.
x is 0.1 to 3.8;
y is 0.1 to 3.8;
z is 0.1 to 3.8;
the sum of (x+y+z) is 2 to 4; and the substituents, represented by x, y and z, are only attached to a β position on the phthalocyanine ring and the dyes are free from fibre reactive groups.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or $SiX_2$, where in X is OH or Cl, more preferably Sc, Ti, Va, Cr, Mn, Fe, Co, Zn, Ni and Cu, especially Cu or Ni and more especially Cu.

Preferably $R^3$ and $R^4$ independently are H, methyl, ethyl, hydroxyethyl or ethyl sulfonic acid.

Preferably $R^3$ and $R^4$ are independently methyl or H.

More preferably $R^3$ and $R^4$ are both H.

L is preferably -alkylene-, optionally substituted or optionally interrupted by a hetero atom or a double or triple carbon to carbon bond; optionally substituted -arylene-; or optionally substituted -heterocyclene-.

More preferably L is $C_{1-4}$ optionally substituted alkylene, especially $C_{1-4}$ alkylene; or optionally substituted phenyl, especially phenyl.

It is particularly preferred that L is $C_{1-4}$ alkylene, especially —$C_2H_4$—.

Optional substituents for $R^2$, $R^3$, $R^4$ and L, when it comprises optionally substituted -alkylene-, are preferably, independently, optionally substituted alkoxy (preferably $C_{1-4}$-alkoxy), optionally substituted aryl (preferably phenyl), optionally substituted aryloxy (preferably phenoxy), optionally substituted heterocyclyl (preferably triazinyl), polyalkylene oxide (preferably polyethylene oxide or polypropylene oxide), $CO_2H$, $SO_3H$, $PO_3H_2$, nitro, cyano, halo (preferably Cl and Br), ureido, —$SO_2F$, hydroxy, ester, —$NR^aR^b$, —$COR^a$, —$CONR^aR^b$, —$NHCOR^a$, carboxyester, sulfone, and —$SO_2NR^aR^b$ wherein $R^a$ and $R^b$ are each independently H or optionally substituted alkyl (especially $C_{1-4}$-alkyl). Optional substituents for any of the above substituents may be selected from the same list of substituents.

Optional substituents for A and B, when they are other than H, and L, when it is optionally substituted -arylene- or optionally substituted -heterocycylene-, are preferably independently selected from; optionally substituted alkyl (preferably $C_{1-4}$-alkyl), optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —$SO_2F$, hydroxy, ester, —$NR^aR^b$, —$COR^a$, —$CONR^aR^b$, —$NHCOR^a$, carboxyester, sulfone, and —$SO_2NR^aR^b$, wherein $R^a$ and $R^b$ are each independently H or optionally substituted alkyl (especially $C_{1-4}$-alkyl). Optional substituents for any of the substituents described above may be selected from the same list of substituents.

Preferably A and B independently are H, —OH, —SH, —$NH_2$, or substituted —O, —S or —N.

In one embodiment A and/or B comprise at least one anionic group especially carboxy and/or sulfo.

It is especially preferred that when A and B are other than H they are independently selected from the group consisting of —OH, —$NHCH_3$, —$N(CH_3)_2$, —$NHC_2H_4SO_3H_2$, —$N(CH_3)C_2H_4SO_3H_2$, —$NC_3H_6SO_3H$, —NHdisulfophenyl, —NHsulphophenyl, —NHcarboxyphenyl or —NHdicarboxyphenyl, —NHsulfonaphthyl, —NHdisulfonaphthyl, —NHtrisulfonaphthyl, —NHcarboxynaphthyl, NHdicarboxynaphthyl, NHtricarboxynaphthyl-NHsulfohetercyclyl, —NHdisulfohetercyclyl or —NHtrisulfohetercyclyl.

Preferably x is 0.1 to 3, more preferably 0.1 to 2.0, especially 0.2 to 1.5 and more especially 0.3 to 1.0.

Preferably y is 0.1 to 0.9, more preferably 0.2 to 0.8.

Preferably z is 0.1 to 3.5, more preferably 0.5 to 3, especially 0.8 to 3.0 and more especially 1.0 to 3.

The sum of (x+y+z) is preferably 3 to 4, more preferably the sum of (x+y+z) is 4.

The mixture of dyes of Formula (1) are free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the mixture of dyes of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the mixture of dyes of Formula (1), particularly acid groups, are preferably in the form of a salt. Thus, the Formulae shown herein include the mixture of dyes in salt form.

Preferred salts are alkali metal salts, especially lithium, sodium and potassium, ammonium and substituted ammonium salts (including quaternary amines such as (($CH_3)_4N^+$) and mixtures thereof. Especially preferred are salts with sodium, lithium, ammonia and volatile amines, more especially sodium salts. The mixture of dyes of Formula (1) may be converted into a salt using known techniques.

The dyes in the mixture of dyes of Formula (1) may exist in tautomeric forms other than those shown in this specification. These tautomers are included within the scope of the present invention.

The mixture of dyes of Formula (1) are preferably prepared by a process comprising cyclisation of a β-substituted phthalic acid or analogue thereof. Preferred β-substituted phthalic acid analogues include phthalonitrile, iminoisoindoline, phthalic anhydride, phthalimide and phthalamide or mixtures thereof.

The cyclisation reaction may be carried out in the presence of a suitable source of ammonia (if required), and (if required) a suitable metal salt, for example $CuCl_2$, and a base such as 1,8-diazabicyclo[5.4.0]undec-7-ene (DBU) followed by, if required, further synthetic steps, for example, chlorination and then amidation.

The total amount of x+y+z may be controlled by varying the degree and ratio of substituted phthalic acid or analogue thereof to unsubstituted phthalic acid or analogue thereof. Thus, when mono-substituted phthalic acid or analogue thereof is used in the cyclisation reaction then x+y+z is 4.

In a preferred synthetic preparation of phthalocyanine dyes of Formula (1) the phthalocyanine ring is prepared by the cyclisation of 4-sulfophthalic acid, preferably to phthalocyanine β-tetrasulfonic acid.

When a phthalocyanine β-sulfonic acid is an intermediate in a route to dyes of Formula (1) it may be chlorinated by reacting with any suitable chlorinating agent.

Chlorination is preferably carried out by treating the phthalocyanine β-sulfonic acid with chlorosulfonic acid preferably in the presence of an acid halide such as thionyl chloride, sulfuryl chloride, phosphorous pentachloride, phosphorous oxychloride or phosphorous trichloride.

The —$SO_2Cl$ substituent, so formed, on the phthalocyanine ring is then further reacted with a compound of formula $NHR^1R^2$ and (either sequentially or at the same time) a compound of formula:

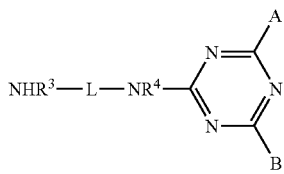

or with a compound of formula NHR$^1$R$^2$ and (either sequentially or at the same time) a compound of formula HR$^3$N-L-NR$^4$H, the product of which can then be reacted with cyanuric chloride and then with A and B (or activated precursors thereof) either singly or at the same time.

A skilled person will appreciate that the product of these reactions will be a disperse mixture and so the values of x, y and z will represent an average of the groups present in the mixture.

The mixture of dyes of Formula (1) have attractive, strong cyan shades and are valuable colorants for use in the preparation of ink-jet printing inks. They benefit from a good balance of solubility, storage stability and fastness to water and light.

According to a second aspect of the present invention there is provided a composition comprising a mixture of dyes of Formula (1) as described in the first aspect of the invention and a liquid medium.

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. Nos. 4,963,189, 4,703,113, 4,626,284 and EP-A-425,150.

When the liquid medium comprises organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the phthalocyanine dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

Preferred compositions according to the second aspect of the invention comprise:
(a) from 0.01 to 30 parts of a mixture of dyes of Formula (1) according to the first aspect of the invention; and
(b) from 70 to 99.99 parts of a liquid medium;

wherein all parts are by weight

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5, especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C. I. Direct Yellow 86, 132, 142 and 173; C. I. Direct Blue 307; C. I. Food Black 2; C. I. Direct Black 168 and 195; and C. I. Acid Yellow 23.

It is preferred that the composition according to the invention is ink suitable for use in an ink-jet printer. Ink suitable for use in an ink-jet printer is ink which is able to repeatedly fire through an ink-jet printing head without causing blockage of the fine nozzles.

Ink suitable for use in an inkjet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably ink suitable for use in an ink-jet printer has been filtered through a filter having a mean pore size below 10 µm, more preferably below 3 µm, especially below 2 µm, more especially below 1 µm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

A third aspect of the invention provides a process for forming an image on a substrate comprising applying ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. Photographic quality papers are especially preferred.

Examples of commercially available premium papers include HP Premium Coated Paper, HP Photopaper™ (both available from Hewlett Packard Inc.); Stylus™ Pro 720 dpi Coated Paper, Epson Photo Quality™ Glossy Film, Epson Photo Quality™ Glossy Paper (all available from Seiko Epson Corp.); Canon HR 101 High Resolution™ Paper, Canon GP 201 Glossy™ Paper, Canon HG 101and HG201 High Gloss™ Film, Canon PR101 (all available from Canon); Kodak Premium™ Photopaper, Kodak Premium™ InkJetpaper (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky (available from Konica).

A fourth aspect of the present invention provides a material preferably paper, plastic, a textile, metal or glass, more preferably paper, an overhead projector slide or a textile material, especially paper more especially plain, coated or treated papers printed with a mixture of dyes as described in the first aspect of the invention, a composition as described in the second aspect of the invention or by means of a process as described in the third aspect of the invention.

It is especially preferred that the printed material of the fourth aspect of the invention is a print on a photographic quality paper printed using a process as described in the third aspect of the invention.

A fifth aspect of the present invention provides an ink-jet printer cartridge comprising a chamber and an ink suitable for use in an ink-jet printer wherein the ink is in the chamber and the ink is as defined in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

EXAMPLES

Analysis of Dyes of Formula (1)

Confirmation of the structure of dyes of Formula (1) is by mass spectrometry. Elemental analysis is used to determine the ratios of x, y and z. Thus, in the dyes of the examples below mass spectrometry has shown that in all cases $x+y+z$ is 4. When the sum of x plus y and z, as determined by elemental analysis is not exactly 4 this is thought to be due to the presence of impurities. The presence of these impurities and their effect on the estimated values of x, y and z would be well known to a person skilled in the art who would appreciate that the value of x plus y plus z should not exceed 4 and who would treat the experimentally determined values of x, y and z as indicative of the ratios of the groups. Also with some dyes according to the present invention it is not possible, using elemental analysis, to discriminate between the different sulfonamide substituents. In these cases x and y are quoted as a sum of both sulfonamide groups i.e. (y+z).

Example 1

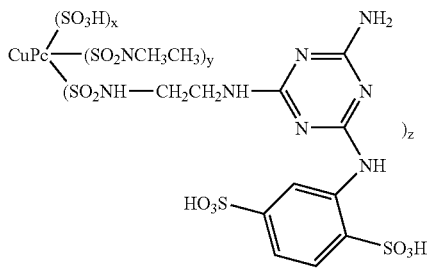

Stage 1

Preparation of copper phthalocyanine tetra-β-sulfonate

Potassium 4-sulfophthalic acid (56.8 g), urea (120 g), $CuCl_2$ (6.9 g), ammonium molybdate (1.2 g) and 1,8-diazabicyclo[5.4.0]undec-7-ene (DBU) (7.5 g) were mixed in a reaction vessel. The mixture was warmed in stages (130° C./30 minutes, 150° C./30 minutes, 180° C./30 minutes, 220° C./30 minutes) over 2 hours and the melt which formed was stirred at 220° C. for a further 2 hours. The resultant solid was extracted 4 times with hot water (4×200 ml) and the extract was filtered to remove insoluble material. The filtrate was stirred at between 60° C. -70° C. and then sufficient NaCl was added to give a 7% salt solution. Stirring was continued and the precipitate was filtered, washed with a 10% salt solution (200 ml) and pulled dry by vacuum. The resultant damp solid (77.6 g) was slurried in acetone, filtered and dried, first at room temperature and then at 50° C.

Stage 2

Preparation of:

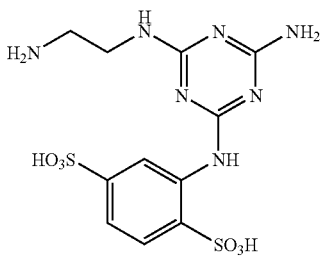

Cyanuric chloride (27.68 g) dissolved in actone (150 ml) was added to a slurry of ice/water (100 g/150 ml) at 0-5° C. A solution of 2,5-disulphoaniline (41.4 g) in water(150 ml) at pH 4 to 5 was then added dropwise. This reaction-mixture was kept below 5° C. and stirred at pH 4 to 5 for 2 hrs. The pH was then adjusted to pH7 with 2M sodium hydroxide solution, the temperature was raised to 20-25° C. and the reaction mixture was left for 1 hour. Ammonia (9.1 ml) was the added and the pH adjusted to pH 9 to 9.5 (with 2M sodium hydroxide) and the reaction mixture was stirred at room temperature overnight. The next day the reaction mixture was heated to 80° C. for 1 h, and then ethylenediamine (99 ml) was added and the reaction mixture was heated at 80° C. for a further 2 hrs. The reaction mixture was then cooled, salted 20% brine, and the pH was lowered to 1 with concentrated HCl. The precipitate that formed was filtered off and washed with 20% brine, it was slurried in methanol at 60° C., filtered and dried to give the above product (56.1 g).

Stage 3

Preparation of the Title Product

Phosphorous oxychloride (5.16 ml) was added dropwise to chlorosulfonic acid (86 g) over 5 to 10 minutes while keeping the temperature below 35° C. When all the $POCl_3$ had been added copper phthalocyanine tetra-β-sulfonate, from Stage 1, (16 g) was added portion-wise while keeping the reaction temperature below 55° C. The reaction mixture was stirred at 50-60° C. for 15-20 minutes. The temperature of the reaction mixture was then gradually increased to 138-140° C. over 30 minutes, held at this temperature for 6.5 h and then the reaction mixture was allowed to cool and stirred overnight at room temperature. The mixture was added to water/ice/(100 ml/150 g) and the resultant precipitate was filtered, washed with ice cold water, pulled dry using a vacuum pump and then dried in a desiccator (15 g). The dried solid (5 g) in water (200 ml) was then added to a mixture of product from Stage2 (2.94 g), in water (50 ml) followed by 40% dimethylamine (0.9 ml) at 0°-5° C. The resultant mixture was stirred at 0° to 5° C. and pH9 to 9.5 for 1 hour maintaining the pH by the addition of 2M sodium hydroxide. The reaction mixture was then stirred at room temperature overnight. The next day the reaction mixture was heated to 60° C., held at this temperature for 1 hour and then cooled to 40° C. The reaction mixture was then salted with 20% brine and the pH was lowered to pH1 with concentrated HCl. The solid that precipitated was filtered, washed with 20% brine, dissolved in deionised water, dialysed, filtered and then dried at 70° C. to give 4.7 g of product. Elemental analysis of the product gave x=3.3 and (y+z)=0.8.

Example 2

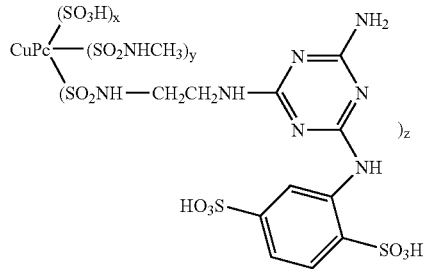

The dye of Example 2 was prepared as described in Example 1 except that in Stage 3, 1 molar equivalent of methylamine was used in place of 2 molar equivalents of dimethylamine, and one molar equivalent of the triazinyl amine formed in Stage 2 was used rather than two molar equivalents. Elemental analysis of the product gave x=1.7 and (y+z)=1.8.

Example 3

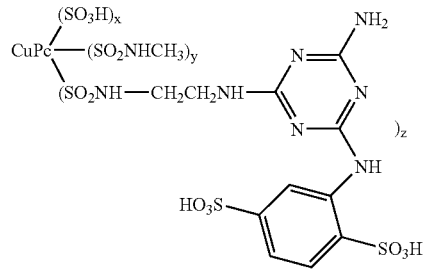

The dye of Example 3 was prepared as described in Example 1 except that in Stage 3 1 molar equivalent of methylamine was used in place of 2 molar equivalents of dimethylamine and two molar equivalents of the triazinyl amine formed in Stage 2 were used rather than two molar equivalents. Elemental analysis of the product gave x=1.2 and (y+z)=3.0.

Example 4

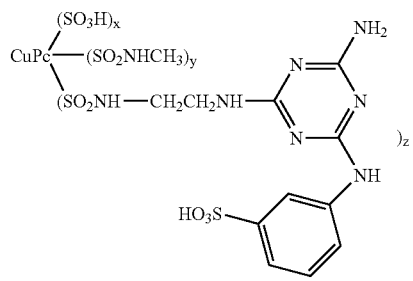

The dye of Example 4 was prepared as described in Example 1 except that in Stage 3 one molar equivalent of methylamine was used in place of dimethylamine, in Stage 2 2-sulfoaniline was used in place of 2,5-disulfoaniline and two molar equivalents of the triazinyl amine so formed in Stage 2 were used rather than three molar equivalents.

Ink and Ink-jet Printing

Ink may be prepared from the dyes of Examples 1 to 4 by dissolving 3 g of the dye in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Surfynol™ 465 is a surfactant from Air Products.

Ink-jet Printing

Ink, prepared as described above, may be filtered through a 0.45 micron nylon filter and then incorporated into an empty print cartridge using a syringe.

The ink can then be ink-jet printed onto either plain paper or specialist media.

Print Evaluation

Prints, formed by ink-jet printing, may be tested for ozone fastness by exposure to 1 ppm ozone at 40° C., 50% relative humidity, for 24 hrs in a Hampden 903 Ozone cabinet. Fastness of the printed ink to ozone can be judged by the difference in the optical density before and after exposure to ozone.

Light-fastness of the printed image may be assessed by fading the printed image in an Atlas Ci5000 Weatherometer for 100 hours and then measuring the change in the optical density.

Optical density measurements can be performed using a Gretag spectrolino spectrophotometer set to the following parameters:

| | |
|---|---|
| Measuring Geometry | 45°/0° |
| Spectral Range | 380-730 nm |
| Spectral Interval | 10 nm |
| Illuminant | D65 |
| Observer | 2° (CIE 1931) |
| Density | Ansi A |
| External Filler | None |

Light and Ozone fastness should be assessed by the percentage change in the optical density of the print, where a lower figure indicates higher fastness, and the degree of fade. The degree of fade can be expressed as $\Delta E$ and a lower figure indicates higher light fastness. $\Delta E$ is defined as the overall change in the CIE colour co-ordinates L, a, b of the print and is expressed by the equation $\Delta E=(\Delta L^2+\Delta a^2+\Delta b^2)^{0.5}$.

Further Inks

The inks described in Tables A and B may be prepared wherein the Dye described in the first column is the Dye made in the above Example of the same number. Numbers quoted in the second column onwards refer to the number of parts of the relevant ingredient and all parts are by weight. The inks may be applied to paper by thermal or piezo ink-jet printing.

The following abbreviations are used in Tables A and B:

PG=propylene glycol
DEG=diethylene glycol
NMP=N-methyl pyrrolidone
DMK=dimethylketone
IPA=isopropanol
MEOH=methanol
2P=2-pyrrolidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Dye Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 1 | 10.0 | 85 | 3 | | 3 | 3 | | | | 5 | 1 | |
| 2 | 2.1 | 91 | | 8 | | | | | | | | 1 |
| 1 | 3.1 | 86 | 5 | | | | | 0.2 | 4 | | | 5 |
| 2 | 1.1 | 81 | | | 9 | | 0.5 | 0.5 | | 9 | | |
| 1 | 2.5 | 60 | 4 | 15 | 3 | 3 | | | 6 | 10 | 5 | 4 |
| 2 | 5 | 65 | | 20 | | | | | 10 | | | |
| 1 | 2.4 | 75 | 5 | 4 | | 5 | | | | 6 | | 5 |
| 2 | 4.1 | 80 | 3 | 5 | 2 | 10 | 0.3 | | | | | |
| 1 | 3.2 | 65 | | 5 | 4 | 6 | | | 5 | 4 | 6 | 5 |
| 1 | 5.1 | 96 | | | | | | | | 4 | | |

TABLE A-continued

| Dye Example | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 10.8 | 90 | 5 | | | | | | 5 | | | |
| 1 | 10.0 | 80 | 2 | 6 | 2 | 5 | | | 1 | | 4 | |
| 1 | 1.8 | 80 | | 5 | | | | | | | 15 | |
| 1 | 2.6 | 84 | | | 11 | | | | | | 5 | |
| 1 | 3.3 | 80 | 2 | | | 10 | | | | 2 | | 6 |
| 1 | 12.0 | 90 | | | | 7 | 0.3 | | 3 | | | |
| 1 | 5.4 | 69 | 2 | 20 | 2 | 1 | | | | | 3 | 3 |
| 1 | 6.0 | 91 | | | 4 | | | | | | 5 | |

TABLE B

| Dye Example | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 1 | 1.5 | 85 | 5 | 5 | | 0.15 | 5.0 | 0.2 | | | | |
| 2 | 2.5 | 90 | | 6 | 4 | | | | | 0.12 | | |
| 1 | 3.1 | 82 | 4 | 8 | | 0.3 | | | | | | 6 |
| 2 | 0.9 | 85 | | 10 | | | | | 5 | 0.2 | | |
| 1 | 8.0 | 90 | | 5 | 5 | | | 0.3 | | | | |
| 2 | 4.0 | 70 | | 10 | 4 | | | | 1 | | 4 | 11 |
| 1 | 2.2 | 75 | 4 | 10 | 3 | | | | 2 | | 6 | |
| 1 | 10.0 | 91 | | | 6 | | | | | | 3 | |
| 1 | 9.0 | 76 | | 9 | 7 | | 3.0 | | | 0.95 | 5 | |
| 1 | 5.0 | 78 | 5 | 11 | | | | | | | 6 | |
| 1 | 5.4 | 86 | | | 7 | | | | | | 7 | |
| 1 | 2.1 | 70 | 5 | 5 | 5 | 0.1 | 0.2 | 0.1 | 5 | 0.1 | 5 | |
| 1 | 2.0 | 90 | | 10 | | | | | | | | |
| 1 | 2 | 88 | | | | | | 10 | | | | |
| 1 | 5 | 78 | | | 5 | | | 12 | | | 5 | |
| 1 | 8 | 70 | 2 | | 8 | | | 15 | | | 5 | |
| 1 | 10 | 80 | | | | | | 8 | | 12 | | |
| 1 | 10 | 80 | | 10 | | | | | | | | |

The invention claimed is:

1. A mixture of dyes of Formula (1) and salts thereof:

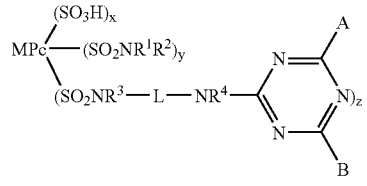

Formula (1)

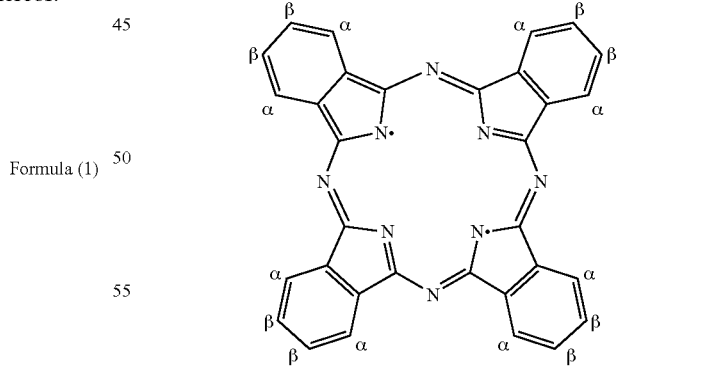

wherein:

M is 2H, Si, a metal, an oxymetal group, a hydroxymetal group or a halometal group;

Pc represents a phthalocyanine nucleus of formula $R^1$ is methyl;

$R^2$ is H or methyl;

$R^3$ and $R^4$ independently are H or optionally substituted $C_{1-4}$ alkyl;

L is a divalent linking group;

A and B are independently H or a substituent;

x is 0.1 to 3.8;

y is 0.1 to 3.8;

z is 0.1 to 3.8;

the sum of (x+y+z) is 2 to 4; and the substituents, represented by x, y and z, are only attached to a β-position on the phthalocyanine ring and the dyes are free from fibre reactive groups.

2. A mixture of dyes according to claim 1 wherein y is 0.1 to 0.9.

3. A mixture of dyes according to either claim 1 or claim 2 wherein M is Cu.

4. A mixture of dyes according to either claim 1 or claim 2 wherein $R^3$ and $R^4$ are independently methyl or H.

5. A mixture of dyes according to either claim 1 or claim 2 wherein $R^3$ and $R^4$ are both H.

6. A mixture of dyes according to either claim 1 or claim 2 wherein L is $C_{1-4}$ alkylene.

7. A mixture of dyes according to either claim 1 or claim 2 wherein A and B are independently selected from the group consisting of —OH, —NHCH$_3$, —N(CH$_3$)$_2$, —NHC$_2$H$_4$SO$_3$H$_2$, —N(CH$_3$)C$_2$H$_4$SO$_3$H$_2$, —NC$_3$H$_6$SO$_3$H, —NHdisulfophenyl, —NHsulphophenyl, —NHcarboxyphenyl or —NHdicarboxyphenyl, —NHsulfonaphthyl, —NHdisulfonaphthyl, —NHtrisulfonaphthyl, —NHcarboxyonaphthyl, NHdicarboxyonaphthyl, NHtricarboxyonaphthyl —NHsulfohetercyclyl, —NHdisulfohetercyclyl or —NHtrisulfohetercyclyl.

8. A mixture of dyes according to either claim 1 or claim 2 wherein the sum of (x+y+z) is 4.

9. A mixture of dyes according to either claim 1 or claim 2 prepared by a process comprising cyclisation of a β-substituted phthalic acid or analogue thereof.

10. A composition comprising a mixture of dyes of Formula (1) as described in either claim 1 or claim 2 and a liquid medium.

11. A composition according to claim 10 wherein the liquid medium comprises a mixture of water and organic solvent or organic solvent free from water.

12. A composition according to claim 11 which is ink suitable for use in an ink-jet printer.

13. A process for forming an image on a substrate comprising applying ink suitable for use in an ink-jet printer, according to claim 12, thereto by means of an ink-jet printer.

14. A material printed with a mixture of dyes as described in claim 1.

15. A material which is a print on a photographic quality paper printed utilizing a process as described in claim 13.

16. An ink-jet printer cartridge comprising a chamber and an ink suitable for use in an ink-jet printer wherein the ink is in the chamber and the ink is as defined in claim 12.

17. A material printed with composition as described in claim 10.

18. A material printed by a process as described in claim 13.

* * * * *